US009875317B2

(12) United States Patent
Vasudevan et al.

(10) Patent No.: US 9,875,317 B2
(45) Date of Patent: Jan. 23, 2018

(54) SYSTEM AND METHOD FOR CONTEXTUALLY ENRICHING CONTENT OF A REFERRER PAGE WHEN RETURNING FROM A LANDING PAGE

(71) Applicant: Yahoo Holdings, Inc., Sunnyvale, CA (US)

(72) Inventors: Sudharsan Vasudevan, Sunnyvale, CA (US); Supreeth Rao, Sunnyvale, CA (US); Utkarsh Shrivastava, Milpitas, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 835 days.

(21) Appl. No.: 13/924,497

(22) Filed: Jun. 21, 2013

(65) Prior Publication Data
US 2014/0380199 A1 Dec. 25, 2014

(51) Int. Cl.
*G06F 3/048* (2013.01)
*G06F 17/30* (2006.01)

(52) U.S. Cl.
CPC .............. *G06F 17/30905* (2013.01)

(58) Field of Classification Search
USPC ................................. 715/700–866
See application file for complete search history.

(56) References Cited

U.S. PATENT DOCUMENTS

| 7,363,282 | B2* | 4/2008 | Karnawat | G06F 17/30867 706/45 |
| 8,543,907 | B1* | 9/2013 | Roskind | G06F 8/443 715/234 |
| 9,367,524 | B1* | 6/2016 | Filev | G06F 17/2247 |
| 2002/0152237 | A1* | 10/2002 | Cohen | G06F 17/3089 715/205 |
| 2005/0131866 | A1* | 6/2005 | Badros | G06F 17/30867 |
| 2006/0259480 | A1* | 11/2006 | Zhang | G06F 17/30882 |
| 2010/0293474 | A1* | 11/2010 | York | G06Q 30/02 715/751 |
| 2011/0264673 | A1* | 10/2011 | White | G06F 17/30867 707/750 |
| 2013/0031079 | A1* | 1/2013 | El Daher | G06F 17/30554 707/706 |
| 2013/0054558 | A1* | 2/2013 | Raza | G06F 17/30867 707/709 |
| 2013/0297697 | A1* | 11/2013 | Haimovitch | H04L 67/26 709/204 |

* cited by examiner

Primary Examiner — William Trapanese
(74) Attorney, Agent, or Firm — Martine Penilla Group, LLP

(57) ABSTRACT

Methods and systems for providing content on a webpage includes rendering a webpage having a plurality of page areas. Each of the plurality of page areas is associated with an entity having display content. Selection of one of the plurality of page areas is detected. The selection causes a landing page to be rendered in place of the webpage. A return to the webpage from the landing page is detected. In response to the return, the selected page area of the webpage is modified to include at least one additional entity having associated display content.

20 Claims, 8 Drawing Sheets

SYSTEM AND METHOD FOR CONTEXTUALLY ENRICHING CONTENT OF A REFERRER PAGE WHEN RETURNING FROM A LANDING PAGE

BACKGROUND

1. Field of the Invention

The invention relates generally to enriching media content and, more particularly, to providing contextually enriching media content on a webpage based on user action.

2. Description of the Related Art

Online media content has become a major source of information resource to users. Users are able to access the information through webpages provided by content providers. The webpages provided by the content providers may include a plurality of content entities (or simply "entities") of varied types, such as audio, video, textual, graphics, pictures, etc., and users are able to access information related to the entities through interactive links provided on the webpage.

When a user visits a webpage and selects a link associated with an entity rendered on the webpage, the link leads the user to a landing page where the content related to the entity is displayed. After reviewing the content, when a user returns to the original webpage using a back button, a backward swipe, or other options, the user is returned to the original webpage and the cursor is position at the location of the selected entity. In order to preserve uniform user experience, the content providers maintain the original source content of the entities on the webpage. Even when the user has explicitly shown interest in a particular entity on the webpage by selecting an associated link, the user's expressed interest and action have not been used to influence change in the content in the original webpage. With growing competition to attract and engage users' attention, it would be advantageous for a content provider to capture the user's explicit interest and find ways to enhance the source of the navigational entities presented on the webpage in order to keep the users engaged in the webpage for a long time.

It is in this context that the embodiments of the invention arise.

SUMMARY

Embodiments of the disclosure provide methods and system for providing online media content to users on webpages or media pages provided by content providers. It should be appreciated that the present embodiments can be implemented in numerous ways, such as a process, an apparatus, a system, a device, or a method on a computer readable medium. Several embodiments are described below.

In one embodiment, the present invention includes a method for providing content to users on a webpage or a media page. The method includes detecting selection of an entity rendered on the webpage. The webpage includes a plurality of entities with each of the plurality of entities being rendered in a distinct page area on the webpage. In response to the selection of the entity, a landing page with content associated with the selected entity, is rendered. In response to detecting selection of the entity on the webpage, a return from the landing page to the webpage is detected. In response to the detection to the webpage, the page area on the webpage is updated. The updating includes changing content of the page area of the selected entity to add one or more additional entities that provide additional content that is contextually related to the selected entity.

In another embodiment, a method is disclosed. The method includes rendering a webpage. The webpage includes a plurality of pages areas with each page area being associated with an entity having display content. Selection of one of the page areas on the webpage, is detected. The selection of the page area causes a landing page to be rendered in place of the webpage. A return to the webpage from the landing page is detected. In response to the detection of return, the page area of the webpage is modified to include at least one additional entity having associated display content.

In another embodiment, a non-transitory computer-readable media with program instructions, which when executed by a processor performs a method. The program instructions within the computer-readable medium includes program instructions for rendering a webpage having a plurality of page areas, wherein each page area is associated with an entity having display content; program instructions for detecting selection of one of the plurality of page areas, the selection causing a landing page to be rendered in place of the webpage; and program instructions for detecting a return to the webpage from the landing page, and for the return, the program instruction is configured to modify the page area of the webpage to include at least one additional entity having associated display content.

The advantages of the various embodiments include enhancing page area of a source on the webpage selected for navigating to a landing page, to include one or more additional entities that are relevant to the context that the user has shown explicit interest, enriching a user's web browsing experience. The embodiments make optimal use of the limited page area available on the webpage by using the page area of a selected entity to provide additional entities that are relevant to the context of the selected entity. In other words, the various embodiments provide feedback acknowledging the relevancy of the selected entity to the user by providing additional content details related to the context of the selected entity.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION

Embodiments of the present invention provide system, computer readable media having program instructions, and methods for providing online media content on a webpage or a media page to users. More particularly, according to various embodiments of the present invention, additional details that are relevant to the context of a selected entity are identified from different media sources and presented within a page area of the selected entity on the webpage. Program logic for detecting selection of an entity rendered on a webpage and providing additional online media content for the selected entity may be embedded within a recommendation engine executing on a server. The recommendation engine includes program logic to detect selection of an entity from a plurality of entities rendered on a webpage and in response, a landing page with content related to the selected entity, is rendered. When a return to the webpage from the landing page is detected, the recommendation engine is configured to identify additional entities with content that is related to the context of the selected entity. The identified additional entities are presented in place of or in addition to the selected entity at the page area where the selected entity was rendered on the webpage. The additional entities provide contextually relevant information or details for the content of the selected entity to enhance the user's knowledge on the subject of the selected entity.

The recommendation engine may identify a plurality of additional entities that are relevant to the context of the landing page and select a few of the additional entities from the plurality of additional entities based on the relevancy of the content of the additional entities to the context of the selected entity. The selection of the additional entities for rendering at the page area may be based on a contextual relationship score defined by use metrics computed at the landing page. Based on the contextual relationship score, the additional entities may be ranked and a subset of the additional entities may be identified based on the relative ranking. The subset of the additional entities is then used to update the webpage so that the additional entities are rendered within the confines of the page area of the selected entity. The additional entities may also be presented within the confines of the webpage.

Figure 1:
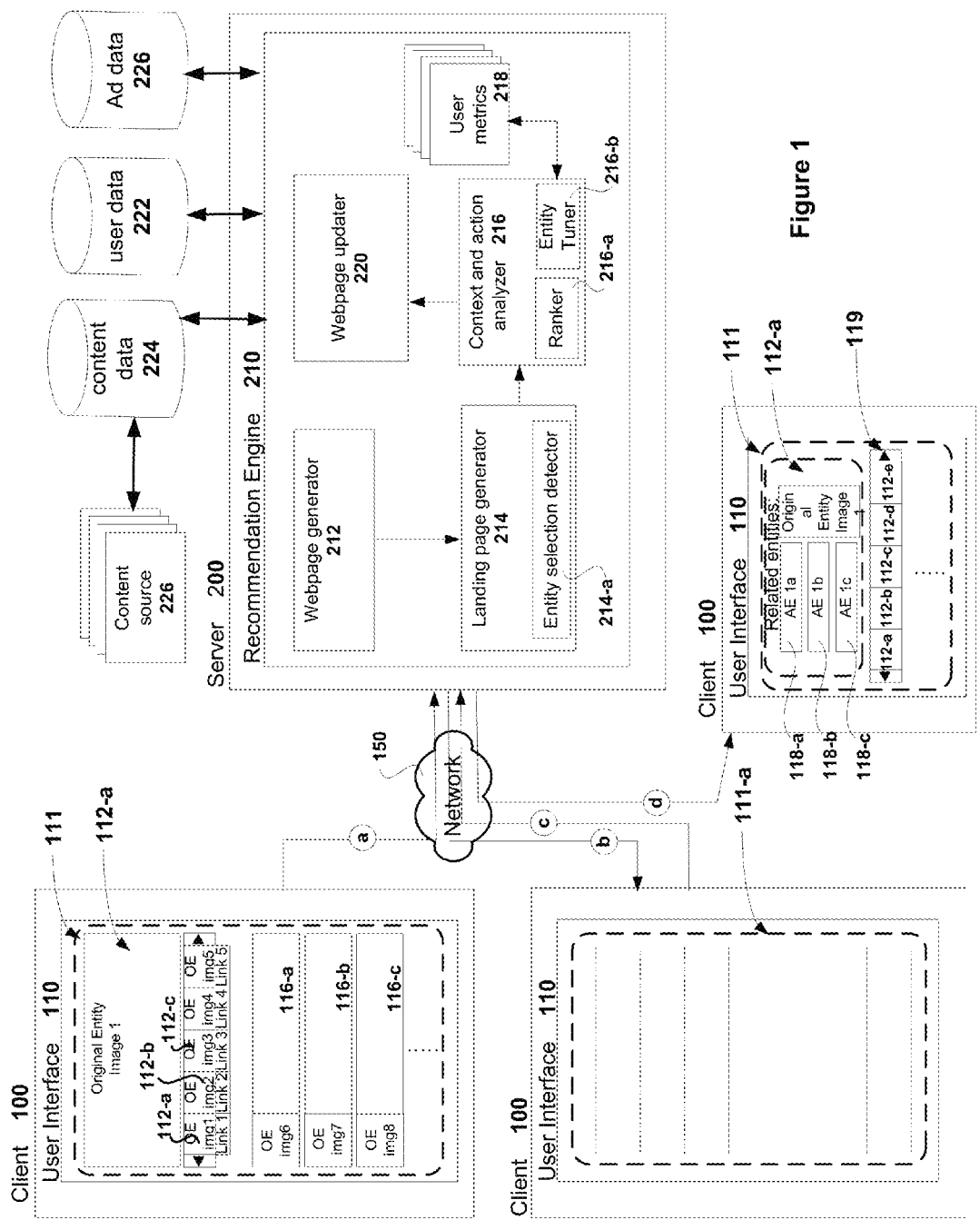
FIG. 1 is an illustration a simple block diagram of a system for providing media content on a webpage, in accordance with an embodiment of the present invention.

FIG. 1 illustrates an exemplary system that is used for providing additional information related to a selected entity or additional entities related to a context of a selected entity within the page area associated with the selected entity on a media page or a webpage. The system includes a client device 100 with a display device having a user interface 110 that is configured to generate a request for a webpage, render the webpage, capture selection activities at an entity rendered on the webpage and render a landing page with content for the selected entity. Additional entities are identified and rendered at the page area of the selected entity, in response to a return to the webpage from the landing page.

The system also includes a server 200 executing programming instructions of an algorithm, such as a recommendation engine algorithm 210. The recommendation engine includes a plurality of modules that are configured to detect and receive user input and/or interactivities from the client device over a network 150, such as the Internet, and respond to the user input/interactivities by providing a webpage with one or more entities. The recommendation engine is also configured to detect selection actions on the webpage and, in response, provide additional information for a selected entity that are rendered on a landing page. The recommendation engine also detects return to the webpage from the landing page and, in response, serves contextually relevant additional entities at the page area of the webpage.

The plurality of modules within the recommendation engine 210 performs different functions related to providing additional entities that are relevant to the context of the content of the selected entity. Some modules provided within the recommendation engine 210 include a webpage generator module 212, a landing page generator module 214, a content and action analyzer module 216 and a webpage updater module 220. The landing page generator module 214 includes an entity selection detector module 214-a. The content and action analyzer module (or simply an "analyzer module") 216 includes a ranker module 216-a and an entity tuner module 216-b. Additionally, the recommendation engine 210 includes a use metrics data store 218 to store use metrics of the users based on the interactions detected by the analyzer module 216. The aforementioned modules are exemplary and should not be considered restrictive or exhaustive. Fewer or additional modules may be provided within the recommendation engine 210 to enable identification of additional entities relevant to the context of a selected entity.

The webpage generator module 212 detects a user request originating from the user interface 110 of the client device 100. The request is for a webpage or a media page. The request for the webpage at the client device 100 may be in response to a user's direct access to a website of a content provider or may be in response to successful user authentication to a website of a content provider, wherein the direct access or access through user authentication is enabled through the user interface 110 of the client device 100. In case where the webpage is provided upon user authentication, the webpage generator module 212 may interact with the user data store 222 to verify the user's authentication prior to servicing the request for the webpage.

In response to the request for the webpage, the webpage generator interacts with a content data store 224 to obtain various entities for generating the media page or webpage. In one embodiment, the entities obtained may be related to the website associated with the webpage. The content data store 224 is a locally or remotely accessible repository that receives and stores content from a plurality of content sources 226 and makes them available to the webpage generator 212. Depending on the type of webpage, the webpage generator module 212 may also interact with an ad data store 226 to obtain advertisements or promotional content for rendering on the webpage. The advertisements and/or promotional content, in one embodiment, may be related to the content within the entities selected for presentation on the webpage. The webpage generator assembles the various entities into a webpage by assigning the entities to distinct page areas on the webpage. In one embodiment, each of the entities assembled on the webpage may include an image, some content and a link to additional content. The generated webpage 111 with the entities is then forwarded to the client device 100 for rendering on the user interface 110, as illustrated by bubble 'a'.

User interaction at the webpage 111 is tracked by the recommendation engine 210. When a user selects an entity or a link associated with an entity rendered on the webpage 111, the user selection is detected by an entity selection detector 214-a within the landing page generator module 214 of the recommendation engine 210. In response to the detection of the user selection on the webpage 111, in one embodiment, the landing page generator module 214 generates a landing page to present additional content related to the selected entity. The landing page generator 214 may interact with the content data store 224 to obtain the additional content for the selected entity, package the additional content and return the landing page 111-a with the content to the client device 100 for rendering on the user interface 110, as illustrated by bubble 'b'. In another embodiment, in response to the selection of an entity, the user may be directed to a webpage of a third-party content provider that provides additional content related to the selected entity. In this embodiment, the landing page generator module 214 may detect the selection of the entity and store the details of when the user selected the entity on the webpage. This information may be used to determine contextual relationship score, as will be described in more detail below. The landing page generator module shares the selection activity at the entity with the analyzer module. The selected entity and the content for the selected entity provided in the landing page may be of any data type including text, audio, video, graphics, image, etc. In one embodiment, in response to the selection of an entity rendered on the webpage, the landing page is provided in place of the webpage.

When the landing page is provided by a content provider that provided the webpage, user interactivities at the landing page 111-a rendered on the user interface 110 of the client device 100, are tracked by the analyzer module (or simply the "analyzer module") 216. The user interactivities are related to selection of content within the landing page, selection of content above a fold (i.e., display area) of the landing page by using a scroll-up feature, selection of content below the fold of the landing page by using a scroll-down feature, dwell time in the landing page, dwell time at certain portions of the landing page, interactivities associated with returning to the webpage from the landing page, such as a backward swipe, selection of a back button, or any other form of action or gesture that is indicative of a return to the webpage. In the case where the user is directed to a third-party website, the user's interactivities related to the return from the landing page will be tracked by the analyzer module. When one of the user's interactivities detected by the analyzer module is a backward swipe, selection of back button or some other gesture and interactivity that is indicative of the user's return to the original webpage, the analyzer module 216 registers this interactivity, as illustrated by bubble 'c', and analyzes the information collected from the user interactivities to compute one or more use metrics. In one embodiment, in addition to analyzing the information collected from user interactivities, the analyzer module may analyze the content of the landing page to determine the context of the content rendered in the landing page.

Some of the use metrics computed by the analyzer module 216 may include dwell time of the user (i.e., amount of time the user spent) at the landing page, the dwell time of the user at the content rendered above a fold, dwell time of the user at the content rendered below the fold, etc. The use metrics define the relevance of the content to the user. In order to compute some of the aforementioned use metrics, the analyzer module 216 may employ a timer to keep track of the various interactivities at the landing page. For example, in one embodiment, a timer may be started or initiated by the analyzer module 216 when the user selects an entity at the webpage, and stopped when the user returns to the webpage from a landing page. The analyzer module 216 may interact with the landing page generator module 214 to determine when the user selects the entity on the webpage to initiate the timer and may track when the user returns to the webpage from the landing page to suspend the timer. This information is used by the analyzer module to determine the user's dwell time at the landing page. The same timer or additional timers may be used by the analyzer module 216 to keep track of the dwell time at various and/or specific portions of the landing page to generate the use metrics. The timer information is evaluated by the analyzer module to determine if the user spent sufficient time in the landing page. Based on the amount of time the user spent at the landing page, the analyzer module may decide to proceed or not to proceed with further analysis of the content in the landing page and to proceed or not to proceed with the computation of the use metrics. A pre-defined threshold value may be used by the analyzer module to determine if the user spent enough time in the landing page to initiate the analysis. If time spent by the user at the landing page exceeds the pre-defined threshold value, the analyzer module will proceed to analyze the content of the landing page to determine the context and to generate the use metrics. The use metrics is used to generate a contextual relationship score in relation to the content and contextual relationship score in relation to specific portions of the content. For example, longer a user spends in the landing page, greater the contextual relationship score for the content. Similarly, longer the user spends on the content above a fold of the landing page, greater the relevancy score for the content above the fold.

The contextual relationship score for the content and/or specific portions of the content is used by the analyzer module to determine the context of the landing page. In one embodiment, the analyzer module identifies keywords within the content/specific portions of the content in the landing page and the associated metadata and ranks the keywords using a ranker module within the analyzer module based on the contextual relationship score of the content/specific portions of the content from where the keywords were identified. The analyzer module then identifies the context and relative categories associated with the keywords. A list of keywords and relevant categories are generated ranked by their importance. The keywords and the related categories from the ranked list are used to search for a plurality of additional entities that are relevant to the user, from various content providers 226 over the network. The analyzer module then uses the use metrics to pare down the plurality of contextually relevant entities to identify a select subset of the additional entities for presentation within a page area of the selected entity on the webpage, in response to the user's return to the webpage.

The webpage updater module 220 interacts with the analyzer module 216 to obtain the subset of the additional entities and updates the page area associated with the selected entity at the webpage by including the additional entities. In one embodiment, the webpage updater module 220 updates the page area of the webpage in which the selected entity was rendered to accommodate the subset of the addition entities, as illustrated by bubble 'd'. In some embodiments, this would entail modifying the page area of the selected entity to replace the selected entity with the subset of additional entities. In another embodiment, the updater module 220 may modify the page area by reconfiguring the page area of the selected entity to accommodate the rendering of the additional entities in addition to the selected entity. In this embodiment, the reconfiguration includes re-sizing the selected entity so that the selected entity can be rendered within a sub-portion of the page area of the selected entity. The remaining page area of the selected entity is used for rendering the subset of additional entities identified by the analyzer module. In one embodiment, the page area of the selected entity that was modified to include the additional entities maintains a original size and location on the webpage. In this embodiment, the modifying or reconfiguring of the page area is performed without modifying or reformatting content adjacent or next to the selected page area. In yet another embodiment, the page area associated with the selected entity and page areas of other entities rendered on the webpage may be updated to present the additional entities identified by the analyzer module.

FIGS. 2a-2d illustrate simplified block diagram representation of webpages and the different ways the updater module may update the additional entities in the page area on the webpage, in various embodiments of the invention. The webpage may include a plurality of entities with each entity being rendered in a distinct page area of the webpage. In one embodiment, currently trending articles or popular entities of the webpage may be presented at a page area 113 rendered at the top of the webpage 111 and the other entities may be presented within a content stream 117 below the popular entities. In one embodiment, the top portion 113 may include the popular entities rendered in carousel form 119 and a primary portion that is used to render an image, brief summary or content related to a popular entity in the carousel 119. When an entity from the carousel form 119 is selected either through active selection (for e.g., by clicking) or through passive selection (for e.g., by hovering over), an image of the entity selected through selection activity is rendered in the primary portion. Instead of the image, a brief summary of the selected entity may also be rendered in the primary portion.

When an entity is selected from the webpage, content related to the selected entity is rendered on a landing page. When the user returns to the webpage from the landing page, a select subset of additional entities are identified for the context of the selected entity rendered in the landing page. In one embodiment illustrated in FIG. 2a, the updater module uses the page area of the selected entity to render the subset of the additional entities identified by the analyzer module alongside the selected entity. As shown, the additional entities 118-a through 118-c are rendered alongside the original selected entity 112-a within the page area of the original selected entity 112-a. In this embodiment, the original selected entity may be re-sized so that it occupies only a portion of the page area that was used for rendering the original selected entity 112-a. Other entities 116-a, 116-b, 116-c, etc., continue to be rendered in the content stream 117 of the webpage 111 in the respective assigned page areas.

Figure 2A:
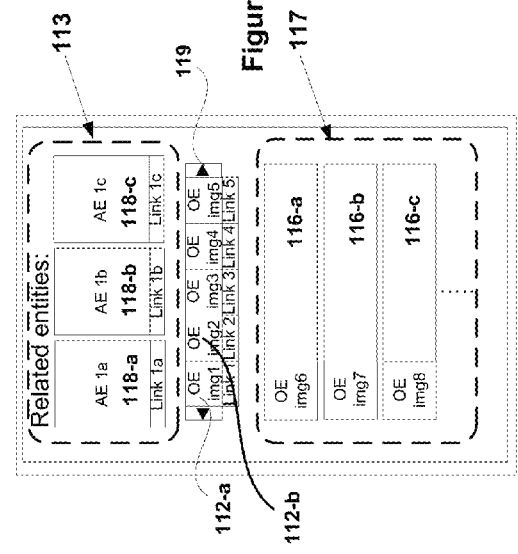
FIGS. 2A-2D illustrate simplified block rendition of webpages for presenting additional entities relevant to the content related to a selected entity, in accordance with various embodiments of the invention.
Figure 2B:
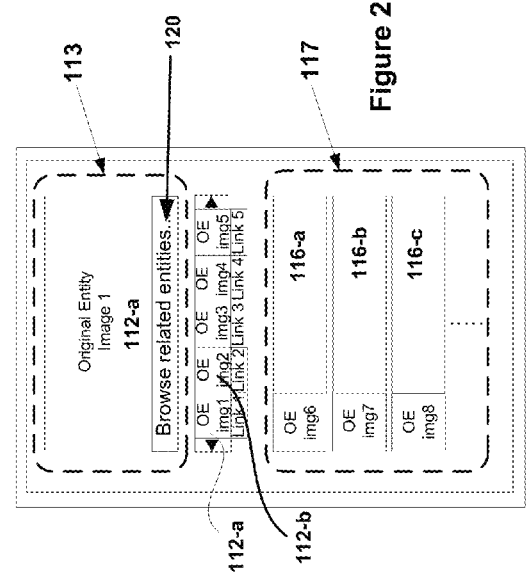

In another embodiment illustrated in FIG. 2b, the additional entities 118-a through 118-c are rendered in place of the selected entity 112-a within the page area of the selected entity 112-a. The page area of the selected entity 112-a, in this embodiment, is the primary portion 113 used for rendering information related to a popular entity selected from the entities rendered in the carousel 119. In this embodiment, each of the subset of the additional entities 118-a through 118-c are sized appropriately for rendering within the page area 113. The updater module continues to render the original entities 112-a, 112-b, etc., in the carousel 119 and the entities 116-a, 116-b, 116-c, etc., within the content stream.

Figure 2C:
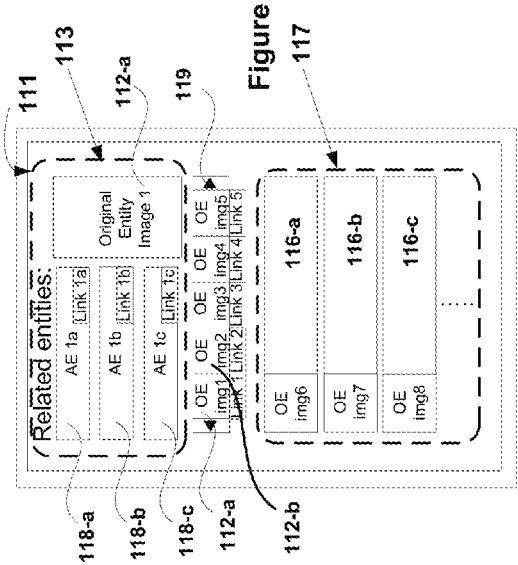

In yet another embodiment illustrated in FIG. 2c, the page area 113 used for rendering the selected entity 112-a may be used by the updater module for rendering an additional entity, entity 118-a, from the sub-set of additional entities identified by the analyzer module. In this embodiment, the additional entity for rendering in the page area 113 may be selected based on the contextual relationship score. In addition to updating the page area 113, the updater module may update the page areas associated with other entities to render the remaining additional entities from the sub-set of additional entities related to the context of the content on the landing page as identified by the analyzer module. Thus, as illustrated in FIG. 2c, the page areas used for rendering original entities 116-a, 116-b, etc., of the content stream are now used to render additional entities 118-b, 118-c, 118-d, 118-e, etc., that are contextually relevant to the context of the content rendered on the landing page. In another embodiment, some of the page areas used for rendering entities of the content stream may be replaced with the additional entities while the remaining entities within the content stream continue to render in the respective page areas.

Figure 2D:
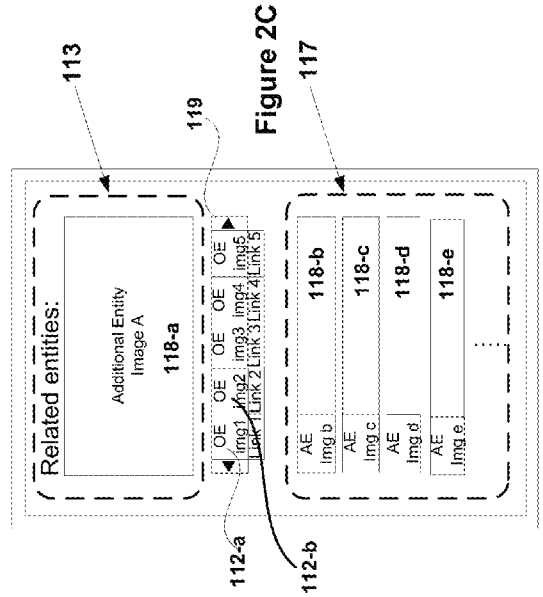

FIG. 2d illustrates an embodiment wherein the updater module may provide additional entities in the form of a browsing option. In this embodiment, the page area 113 of the selected entity 112-a is re-configured to provide an image of the selected entity 112-a as well as the browsing option 120 that is indicative of the presence of additional entities related to the context of the content presented in the landing page. As can be seen from the various embodiments, different layouts may be used by the updater module to provide additional entities having content that are relevant to the context of the content in the landing page. The additional entities are selected based on the use metrics, wherein the use metrics determine the relevancy of the content in the landing page to the user.

Figure 3A:
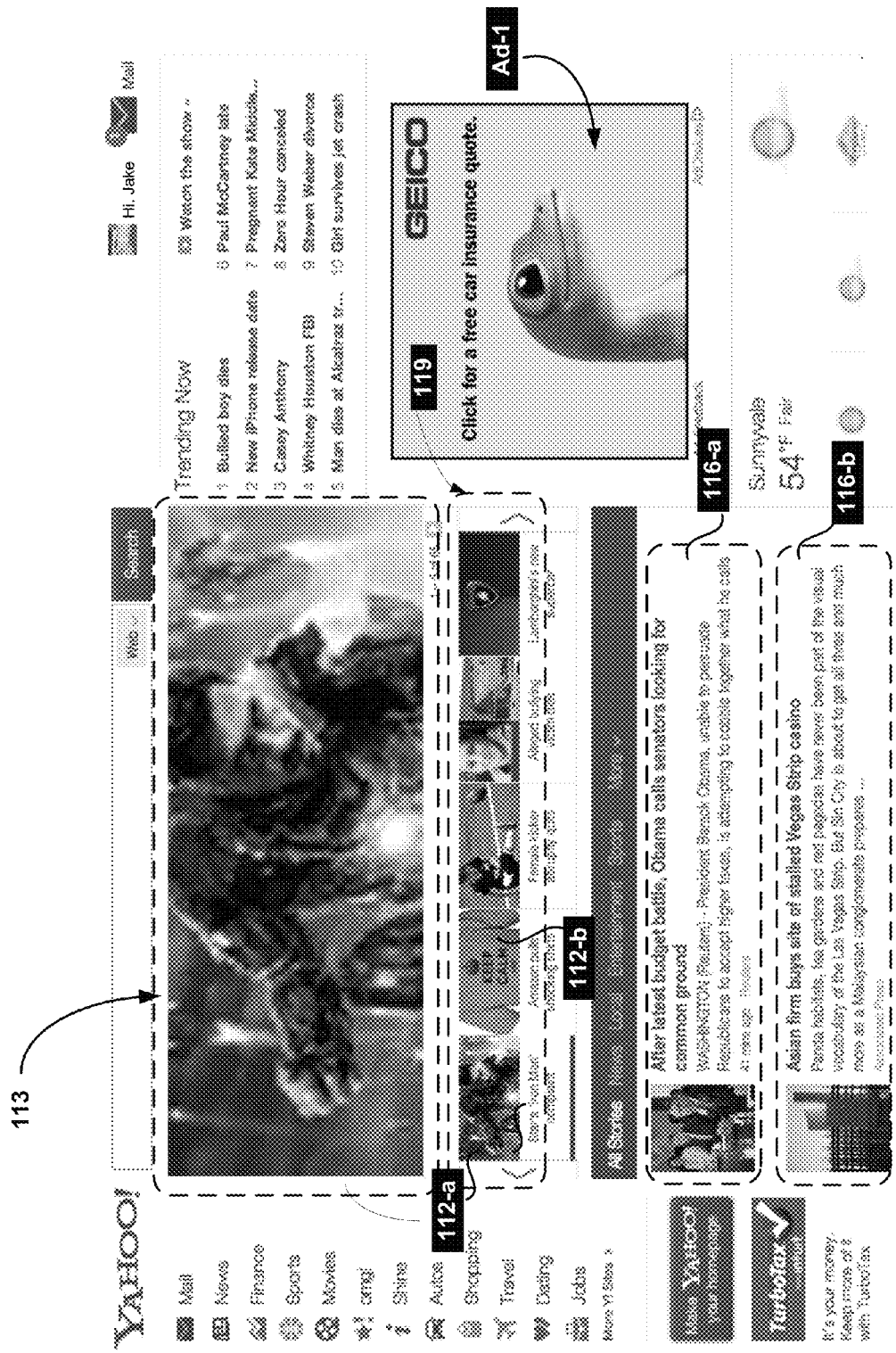
FIG. 3A illustrates an exemplary screen rendition of a webpage with a plurality of entities being rendered at respective page areas, in accordance with one embodiment of the invention.

FIG. 3a illustrates an exemplary media page or a webpage with a plurality of entities rendered thereon. As shown, the webpage includes entities 112-a, 112-b, etc., provided in a carousel form 119 with an image of an entity 112-a selected from the carousel rendered in the primary page area 113. Other entities 116-a, 116-b are provided in the respective real-estate slots in a content stream. Depending on the type of webpage, one or more advertisements ad-1 can also be provided. This webpage may be a web portal page of a content provider.

Figure 3B:
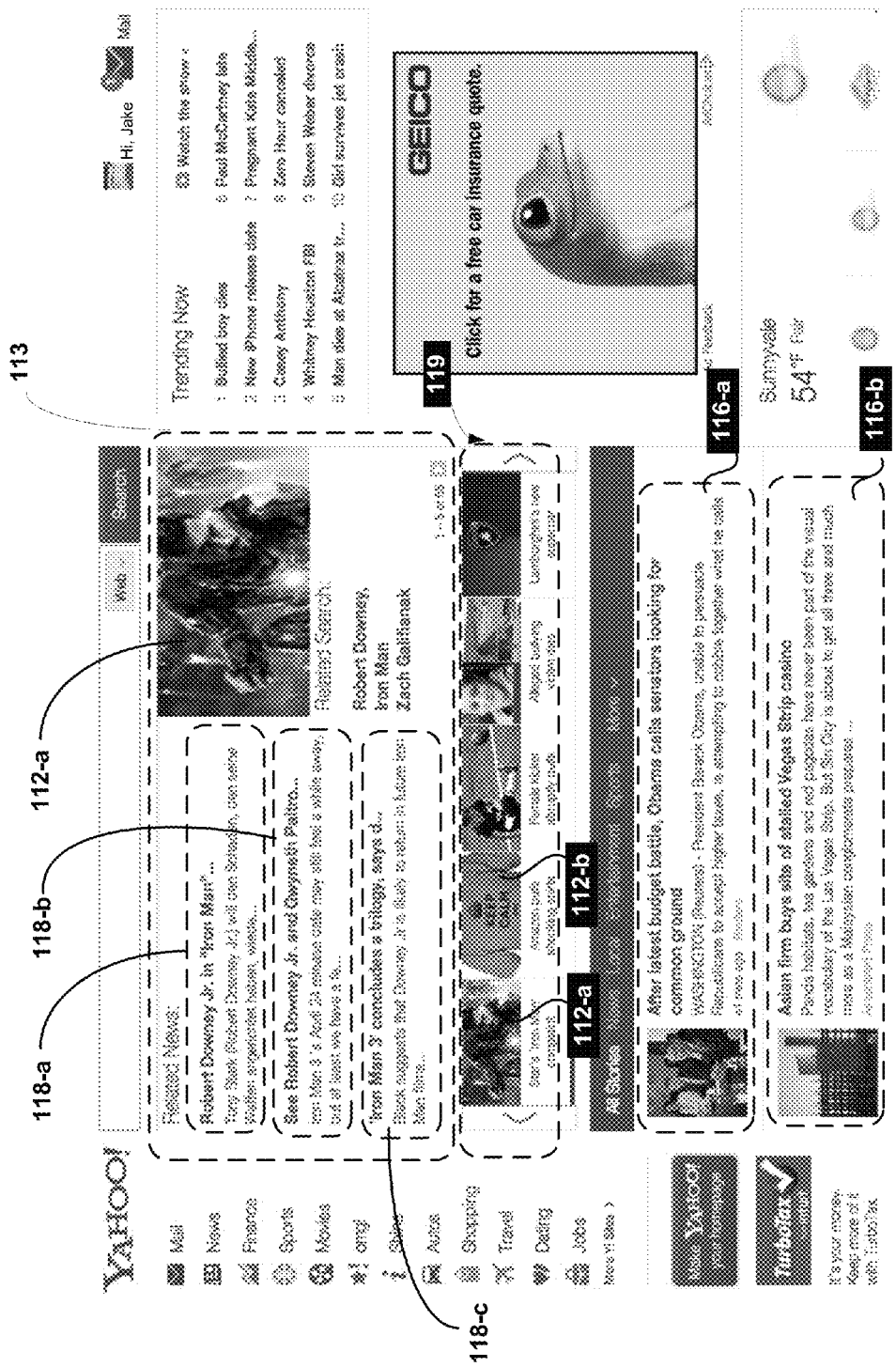
FIG. 3B illustrates an exemplary screen rendition of a webpage with a plurality of additional entities being rendered within a page area of an entity upon a user's return to the webpage from a landing page, in accordance with an embodiment of the invention.

FIG. 3b illustrates an exemplary media page/webpage returned by an updater module of the recommendation engine 210 that includes the additional entities 118-a, 118-b, 118-c rendered alongside the selected entity 112-a at the primary page area 113 of the selected entity 112-a, in response to the user's return to the webpage from a landing page. The content of the additional entities are contextually relevant to the content of the selected entity rendered on the landing page. The additional entities provide additional content for the context of the selected entity. Such information is provided by monitoring interactivities at the content of the selected entity rendered on the landing page.

Figure 4:
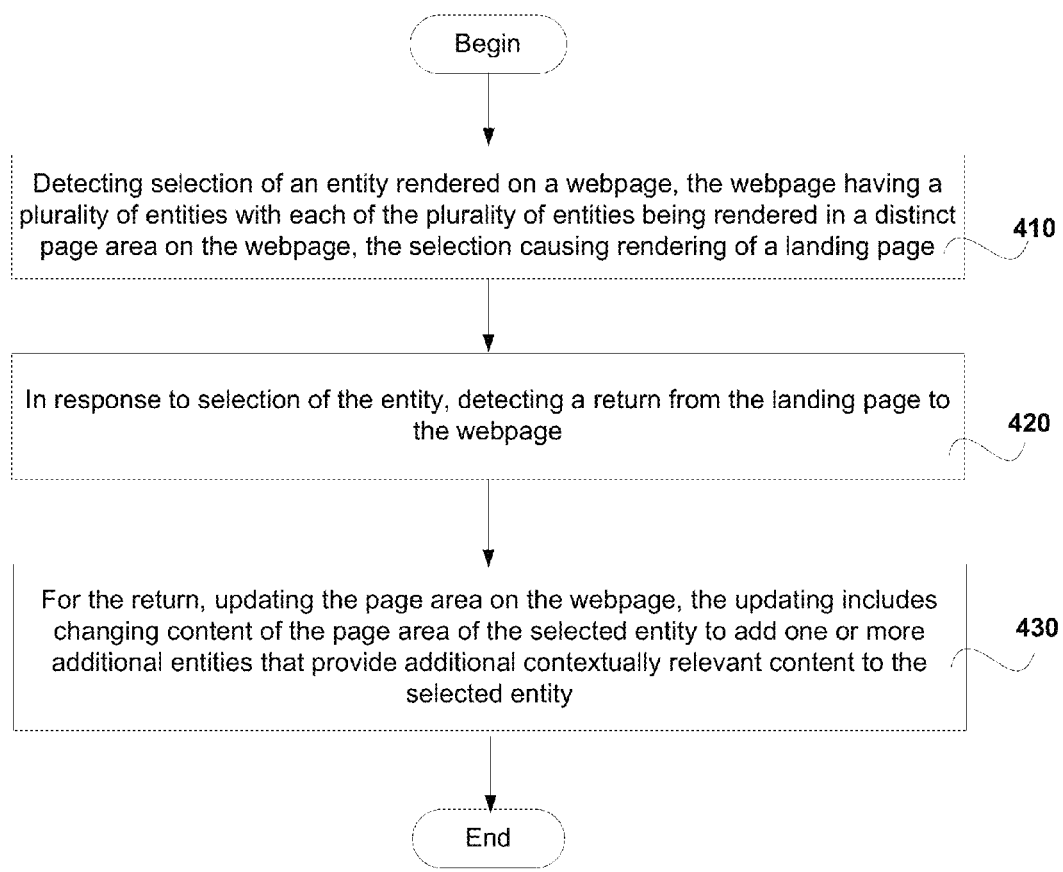
FIG. 4 illustrates exemplary method operations for providing content on a webpage, in accordance with one embodiment of the invention.

FIG. 4 illustrates various method operations for providing additional content on a webpage, in one embodiment. The method begins at operation 410, wherein selection of an entity rendered on a webpage, is detected. The webpage includes a plurality of entities with each of the entities rendered in a distinct page area on the webpage. The webpage may be a front page of a website and each of the entities may provide content of varying types. The selection of the entity is received by a recommendation engine executing on a server. In response to the selection of an entity, a landing page is provided. The landing page, as used in this application refers to an auxiliary page that is either generated by the recommendation engine to render content related to the selected entity or is provided by a third party content provider that is the source of the selected entity. When the content is provided by a third party provider, the selection of the entity will lead to re-direction to a landing page provided by the third party content provider. An entity, as used in this application is content related to a person, place or thing. The content can encompass different content types including information, news, blogs, pictures, images, audio content, video content, etc. The landing page with the content for the selected entity is returned for rendering on a client device, in response to the selection of the entity. The landing page may be presented in place of the webpage.

Interactivities at the landing page are monitored/received at the recommendation engine, as illustrated in operation 420. When the landing page is from the content provider that provided the webpage, the interactivities may include a user's interaction with the content, the user's action on content above a fold, user's action on content below a fold, amount of time a user spends at specific portions of the landing page, selection of a back button, performing a backward swipe gesture, etc. When the landing page is provided by a third-party content provider, the interactivities received at the recommendation engine may include a return from the landing page to the webpage.

In response to the return from the landing page to the webpage, the recommendation engine identifies one or more additional entities that are contextually related to the selected entity and updates the page area on the webpage, as illustrated in operation 430. The recommendation engine may analyze the content in the landing page and/or the received interactivities to determine use metrics. The use metrics identify the relevancy of the content to the user by determining user's interest in the content on the landing page. The use metrics may be computed by determining the dwell time of the user at the landing page or at specific portions of the landing page before the user's return to the webpage. The dwell time spent at the landing page and/or specific portions of the landing page may be compared against a threshold value. For example, if the threshold value is 3 seconds and the user spent less than 3 seconds before returning to the webpage, then the recommendation engine may ignore the interactivities received from the landing page. If, on the other hand, the user spent a considerable amount of time (i.e., greater than the threshold value) at the landing page, the recommendation engine may sense the user's interest in the content on the landing page. As a result, the recommendation engine may analyze the content on the landing page to determine the context.

The recommendation engine may use a content analysis algorithm to determine the context of the content in the landing page. The content analysis algorithm may identify keywords within the content presented in the landing page and the associated metadata and rank the keywords. A top list of keywords is generated and organized in order of importance. The recommendation engine may use the organized list of keywords to identify and obtain a plurality of additional entities from content sources or content providers over the internet. The recommendation engine selects a subset of the plurality of additional entities based on the use metrics. The recommendation engine then configures the page area of the selected entity on the webpage to render the sub-set of additional entities. The recommendation engine may update the page area of the selected entity using any one of the page area layouts discussed with reference to FIGS. 2A-2D.

The current embodiments provide ways for presenting additional content that is relevant to the context of a selected entity and provides the additional content within the page area that is reserved for the selected entity making optimal use of the page area while providing context relevant content personalization for the user. The context relevant content provided by the recommendation engine is a form of feedback to the user acknowledging user's interest in the content and providing additional entities that are related to the content. The relevant content personalization based on the context may be provided at any page area on the webpage including the page area 113, the page area of the content 117 within the content stream or on the entire webpage. In some embodiments, the selected entity rendered within the page area may be re-sized to accommodate the additional entities. The various embodiments not only teach replacing or updating page areas to render additional relevant entities but also provide a browsing option, which when selected may provide a user interface rendering the additional relevant entities. The user interface with the browsing option may be similar to the landing page. In addition to providing browsing option, the an option to provide feedback to the content may also be provided at the page area of the selected entity.

Figure 5:
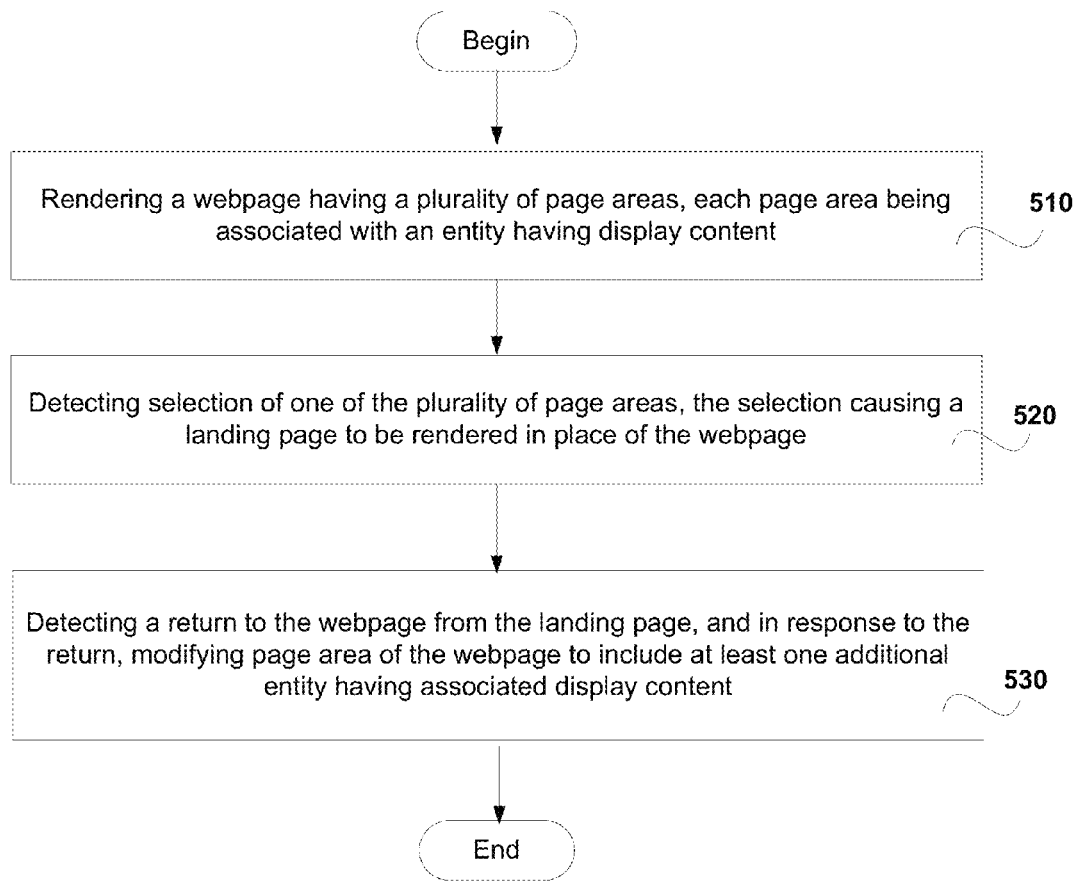
FIG. 5 illustrates exemplary method operations for providing media content on a webpage, in accordance with an alternate embodiment of the invention.

FIG. 5 illustrates method operations of a method, in an alternate embodiment of the invention. The method begins at operation 510, within the rendering of a webpage. The webpage includes a plurality of page areas, with each page area being associated with an entity having display content. Selection of one of the plurality of page areas rendered on the webpage, is detected, as illustrated in operation 520. The selection of the page area causes a landing page to be rendered in place of the webpage. The landing page provides content related to the entity associated with the selected page area. The method concludes in operation 530 when a return to the webpage from the landing page is detected. In response to the return to the landing page, the selected page area of the webpage is modified to include at least one additional entity that has associated display content. The display content of the at least one additional entity may be relevant to the context of the content rendered in the landing page. The resulting webpage provides additional information related to the context of the selected entity that the user has shown interest. In some embodiments, only a portion of the page area of the webpage is used to render the at least one additional entity. In other embodiments, the entire selected page areas on the webpage is used to render the at least one additional entity.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network. A sample computer system is depicted in FIGS. 6A-6C.

Figure 6A:
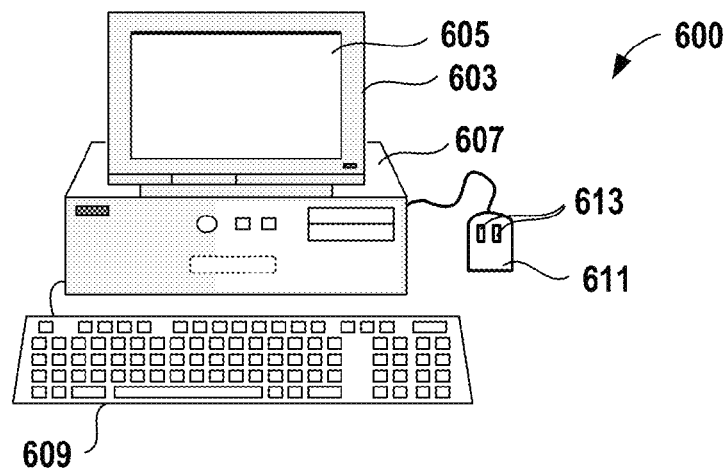
FIG. 6A is a generalized diagram of a typical computer system suitable for use with the present invention.

In FIG. 6A, is an illustration of an embodiment of an exemplary computer system 600 suitable for use with the present invention including display 603 having display screen 605. Cabinet 607 houses standard computer components (not shown) such as a disk drive, CDROM drive, display adapter, network card, random access memory (RAM), central processing unit (CPU), and other components, subsystems and devices. User input devices such as a mouse 611 having buttons 613, and keyboard 609 are shown. Other user input devices such as a trackball, touchscreen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 6B:
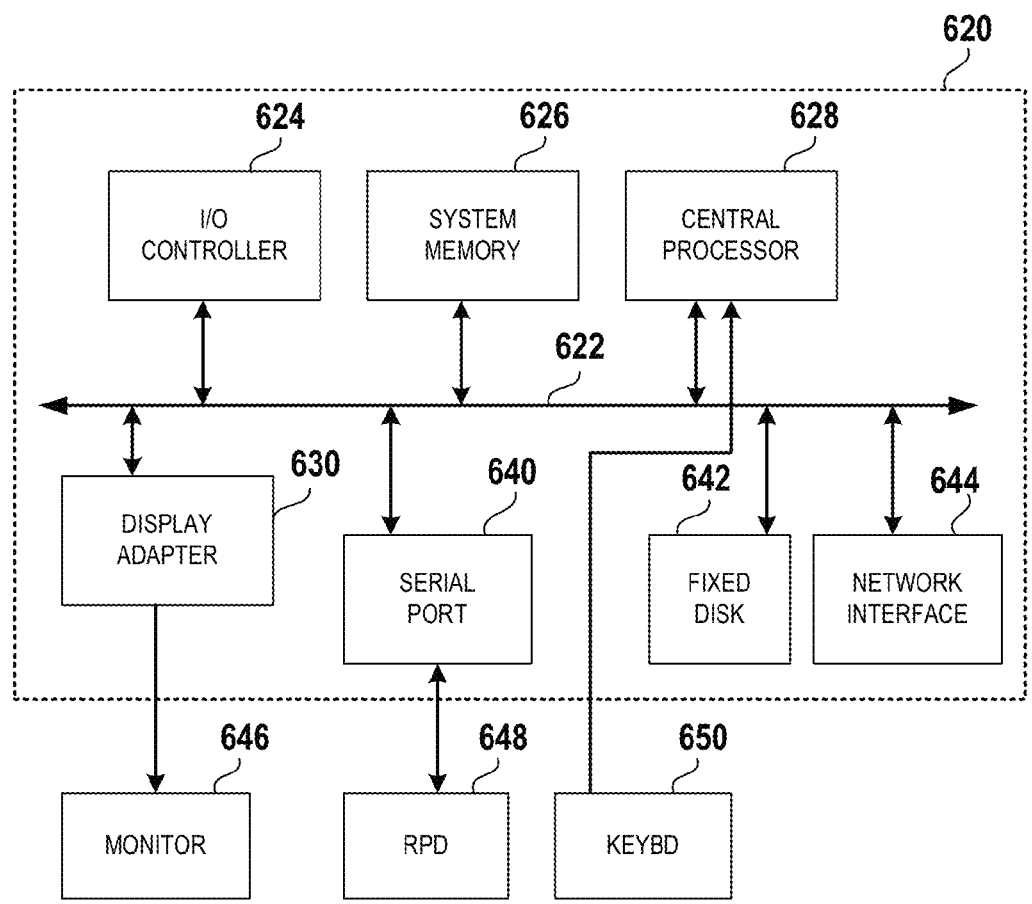
FIG. 6B shows subsystems in the typical computer system of FIG. 6A.
Figure 6C:
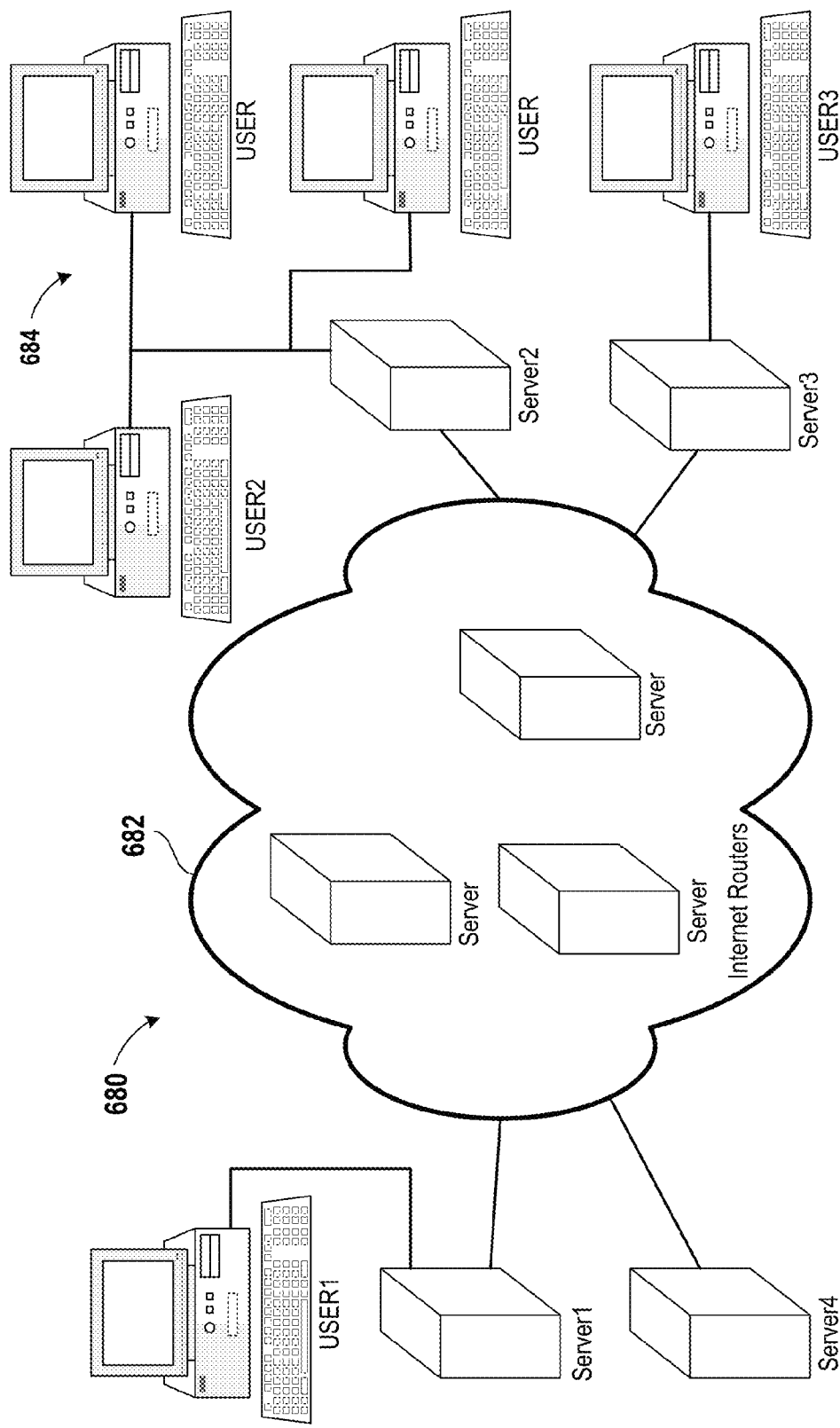
FIG. 6C is a generalized diagram of a typical network suitable for use with the present invention.

FIG. 6B illustrates an exemplary subsystems that might typically be found in a computer such as computer 600. In FIG. 6B, subsystems within box 620 are directly interfaced to internal bus 622. Such subsystems typically are contained within the computer system such as within cabinet 607 of FIG. 6A. Subsystems include input/output (I/O) controller 624, System Random Access Memory (RAM) 626, Central Processing Unit (CPU) 628, Display Adapter 630, Serial Port 640, Fixed Disk 642 and Network Interface Adapter 644. The use of bus 622 allows each of the subsystems to transfer data among the subsystems and, most importantly, with the CPU. External devices can communicate with the CPU or other subsystems via the bus 622 by interfacing with a subsystem on the bus. Monitor 646 connects to the bus through Display Adapter 630. A relative pointing device (RPD) 648 such as a mouse connects through Serial Port 640. Some devices such as a Keyboard 650 can communicate with the CPU by direct means without using the main data bus as, for example, via an interrupt controller and associated registers (not shown).

As with the external physical configuration shown in FIG. 6A, many subsystem configurations are possible. FIG. 6B is illustrative of but one suitable configuration. Subsystems, components or devices other than those shown in FIG. 6B can be added. A suitable computer system can be achieved without using all of the subsystems shown in FIG. 6B. For example, a standalone computer need not be coupled to a network so Network Interface 644 would not be required. Other subsystems such as a CDROM drive, graphics accelerator, etc. can be included in the configuration without affecting the performance of the system of the present invention.

FIG. 6C is a generalized diagram of a typical network. In FIG. 6C, the network system 680 includes several local networks coupled to the Internet. Although specific network protocols, physical layers, topologies, and other network properties are presented herein, embodiments of the present invention are suitable for use with any network.

In FIG. 6C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of server routers 682. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 684 are shown utilizing a local network at a different location from USER1 computer. The computers at 684 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine. Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or personal information manager (also referred to as a "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" or "computer-readable media" for purposes of embodiments of the present invention may be any medium/media that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, carrier wave, or computer memory. The computer readable medium may have suitable instructions for synchronously presenting multiple video program ID streams, such as on a display screen, or for providing for input or presenting in accordance with various embodiments of the present invention.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing content on a webpage, comprising:
   detecting selection of an entity rendered on the webpage, wherein the webpage includes a plurality of entities with each of the plurality of entities being rendered in a distinct page area on the webpage, the content for each of the plurality of entities received from a distinct content provider, the selection causing a landing page for the selected entity to be rendered, the landing page presenting the content associated with the selected entity;
   in response to detecting rendering of the landing page for the selected entity, monitoring interactivity at the landing page;
   detecting a return from the landing page to the webpage; and
   for the return to the webpage, updating the page area related to the selected entity on the webpage, the updating includes reconfiguring the page area of the selected entity by adjusting a size of the selected entity for rendering in a sub-portion of the page area so as to allow rendering of one or more additional entities that provide additional content that is contextually related to the selected entity in remaining portion of the page area of the selected entity while maintaining size of other ones of the plurality of entities rendering in corresponding page areas, the one or more additional entities related to the selected entity identified based on the interactivity at the landing page, content for the one or more additional entities obtained from one or more content providers,
   wherein the method is executed by a processor.

2. The method of claim 1, further comprising,
   analyzing the content at the landing page, the analysis of the content resulting in identification of a plurality of additional entities, each of the plurality of additional entities having a contextual relationship to the content of the entity at the landing page.

3. The method of claim 2, further comprising,
   identifying one or more of the plurality of additional entities based on a contextual relationship score, the identified one or more of the plurality of additional entities added to the page area of the selected entity on the webpage, when the return to the webpage is detected.

4. The method of claim 3, further comprising,
   evaluating the interactivity at the landing page before the return to the webpage, the evaluating of the interactivity used in generating use metrics for the landing page;
   adjusting the contextual relationship score based on the use metrics.

5. The method of claim 4, wherein the use metrics include dwell time on particular sections of the landing page, or hover actions over the particular sections of the landing page.

6. The method of claim 1, wherein reconfiguring of the page area includes changing content of the page area of the selected entity to render the one or more additional entities in addition to the selected entity, the reconfiguring resulting in re-sizing the selected entity within the page area to accommodate the one or more additional entities.

7. The method of claim 1, wherein reconfiguring of the page area includes changing content of the page area of the selected entity to replace the selected entity with the one or more additional entities.

8. The method of claim 1, wherein updating further includes changing content of the page area of the plurality of entities on the webpage to render the one or more additional entities.

9. The method of claim 1, wherein updating includes providing a browsing option at the page area of the selected entity on the webpage, the browsing option configured to provide access to view content related to the one or more additional entities.

10. A method, comprising,
(a) rendering a webpage having a plurality of page areas, each page area being associated with an entity having display content;
(b) detecting selection of one of the plurality of page areas, the selection causing a landing page for the entity associated with the selected page area to be rendered in place of the webpage;
(c) monitoring interactivity at the landing page; and
(d) detecting a return to the webpage from the landing page, and for the return, modifying the selected page area of the webpage by adjusting a size of the entity for rendering in a sub-portion of the selected page area so as to include at least one additional entity having associated display content in a remaining portion of the selected page area while maintaining size of entities in remaining ones of the plurality of page areas, the at least one additional entity related to the entity associated with the selected page area identified based on the interactivity at the landing page,
wherein the method is executed by a processor.

11. The method of claim 10, wherein the display content of the entity rendered in the selected page area is augmented with the display content of the at least one additional entity.

12. The method of claim 10, wherein the display content of the entity in the selected page area is replaced with the display content of the at least one additional entity.

13. The method of claim 10, further comprising,
analyzing the landing page to identify a plurality of contextually related entities;
selecting the at least one additional entity having the associated display content from the plurality of contextually related entities that were identified based on the analysis of the landing page.

14. The method of claim 13, wherein selection of the at least one additional entity is based on a contextual relationship score associated with the contextually related entities.

15. The method of claim 14, further comprising,
evaluating the interactivity at the landing page before the return to the webpage, the evaluating of the interactivity used in determining use metrics for the landing page;
adjusting the contextual relationship score of the contextually related entities based on the use metrics.

16. The method of claim 15, wherein the use metrics include dwell time on particular sections of the landing page, or hover actions over the particular sections of the landing page.

17. The method of claim 10, wherein the selected page area that is modified maintains a size and location on the webpage.

18. The method of claim 10, wherein the plurality of page areas include a carousel of page areas and a primary page area, wherein a hover select over any one of the page areas associated with the carousel renders the hover selected page area in the primary page area.

19. The method of claim 10, wherein detecting selection of (b) is selection of any one of the plurality of page areas that causes the rendering of the landing page, and the modifying of the page area on the detected return of (d) causes the primary page area to include the at least one additional entity having associated display content.

20. A non-transitory computer-readable medium having program instructions, which when executed by a processor performs a method, the program instructions comprising:
(a) program instructions for rendering a webpage having a plurality of page areas, each page area being associated with an entity having display content;
(b) program instructions for detecting selection of one of the plurality of page areas, the selection causing a landing page for the entity associated with the selected page area to be rendered in place of the webpage;
(c) program instructions for monitoring interactivity at the landing page; and
(d) program instructions for detecting a return to the webpage from the landing page, and for the return, modifying the selected page area of the webpage by adjusting a size of the entity for rendering in a sub-portion of the selected page area so as to render at least one additional entity having associated display content in a remaining portion of the selected page area while maintaining size of entities in remaining ones of the plurality of pages areas, the at least one additional entity related to the entity associated with the selected page area is identified based on the interactivity at the landing page.

* * * * *